Feb. 19, 1929.
O. W. MOJONNIER
1,702,741
WEIGHING SCALE
Filed Dec. 26, 1925  3 Sheets-Sheet 1
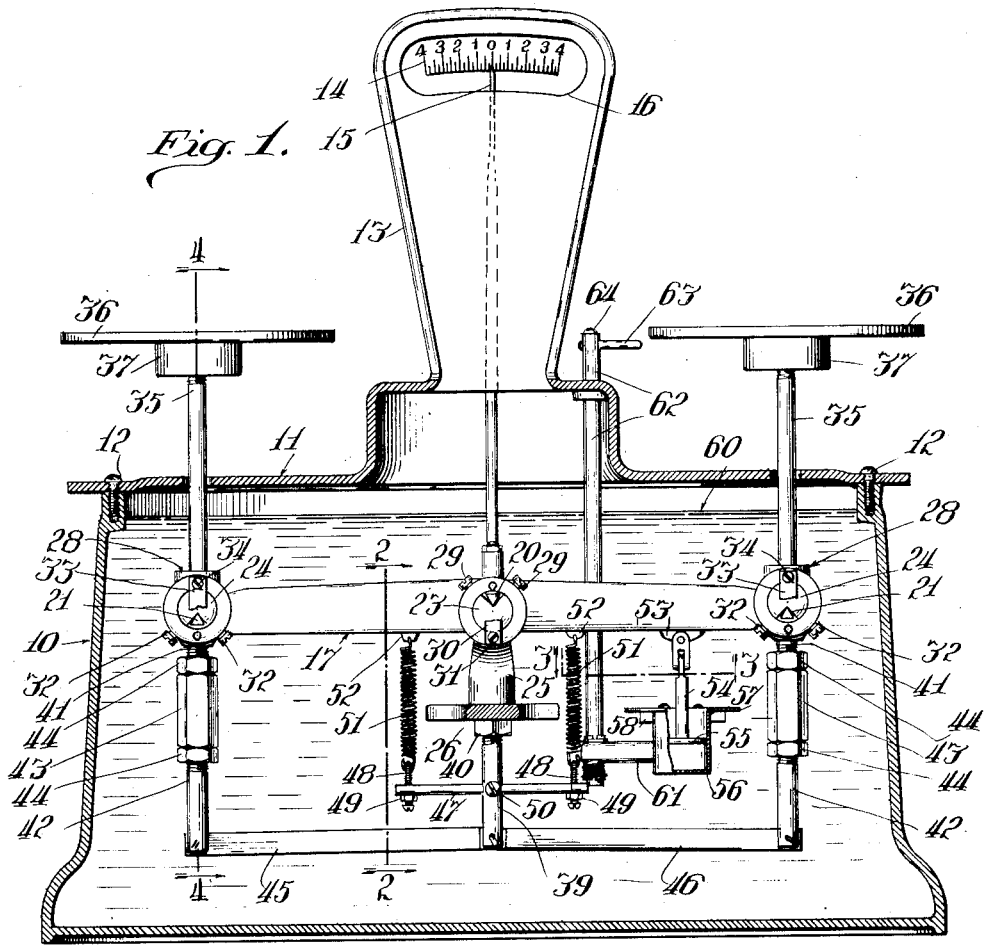
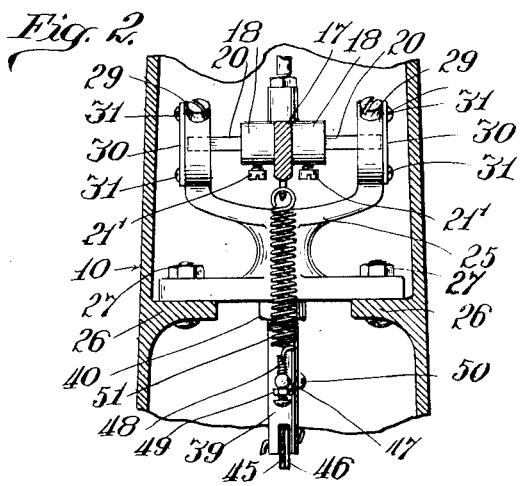
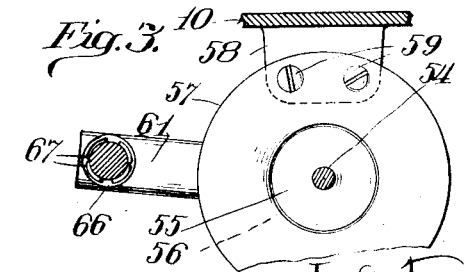
Inventor
Oliver W. Mojonnier
Thomas H. Ferguson
Attorney.

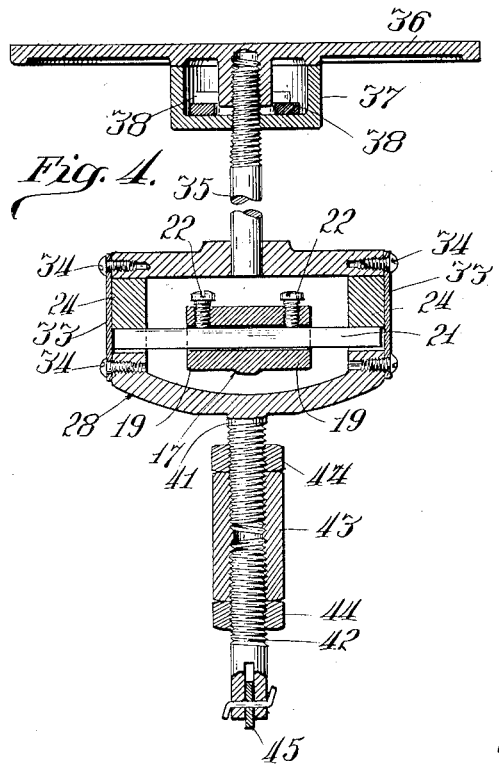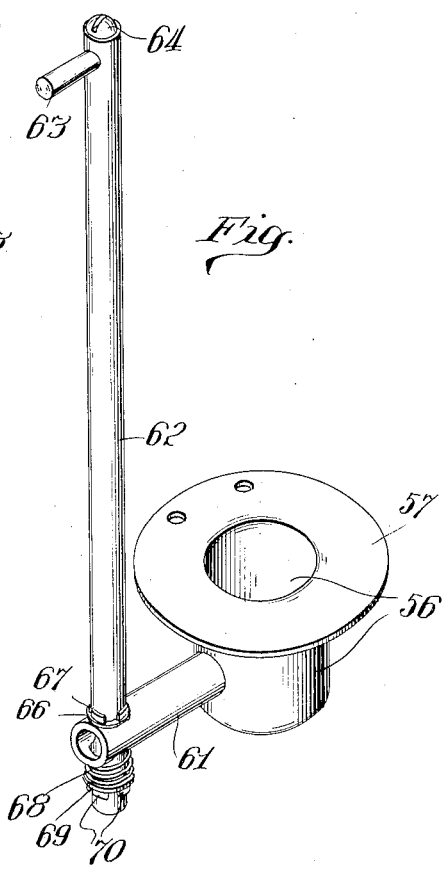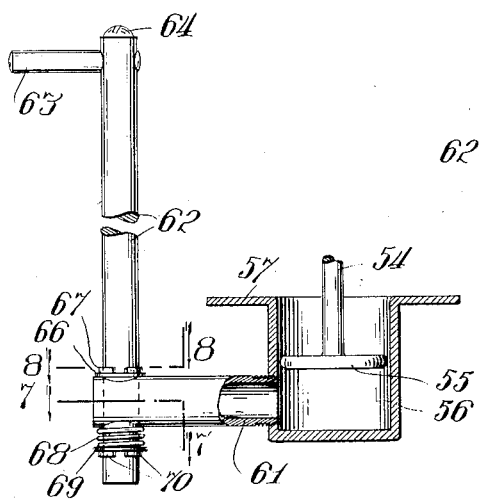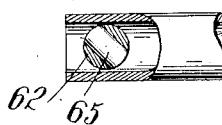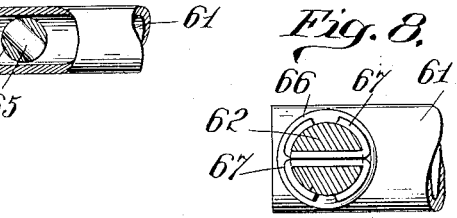
Inventor
Oliver W. Mojonnier
By Thomas H. Ferguson
Attorney Feb. 19, 1929. 1,702,741
O. W. MOJONNIER
WEIGHING SCALE
Filed Dec. 26, 1925   3 Sheets-Sheet 3
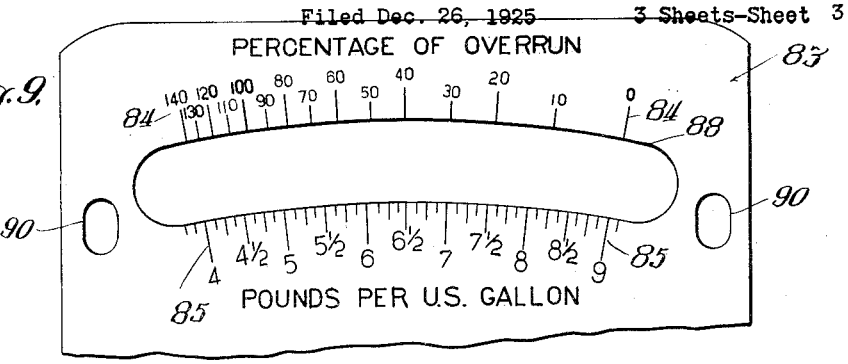
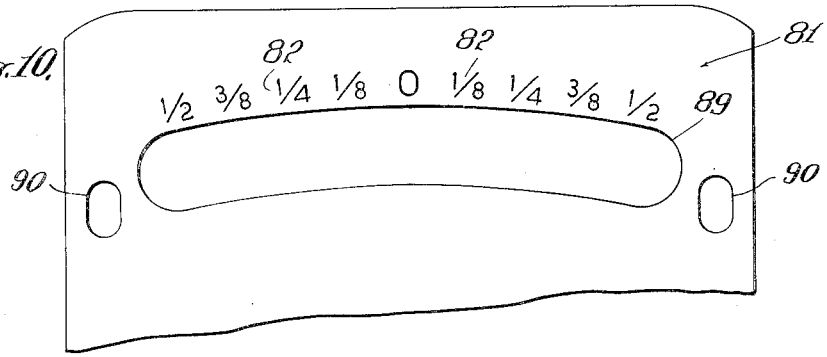
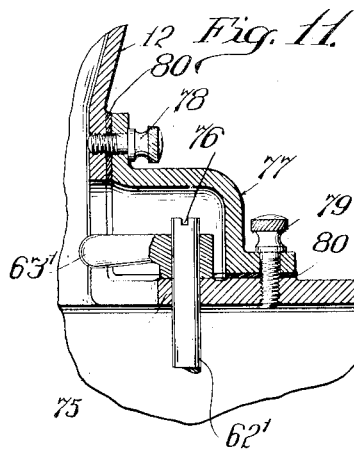
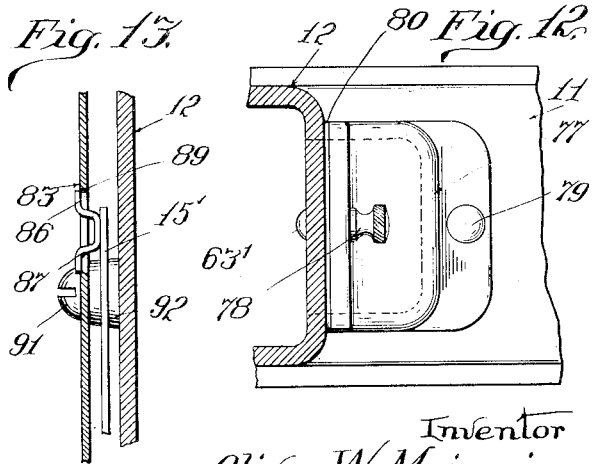
Inventor
Oliver W. Mojonnier
By Thomas H. Ferguson
Attorney Patented Feb. 19, 1929.

1,702,741

UNITED STATES PATENT OFFICE.

OLIVER W. MOJONNIER, OF RIVER FOREST, ILLINOIS, ASSIGNOR TO MOJONNIER BROS. CO., A CORPORATION OF ILLINOIS.

WEIGHING SCALE.

Application filed December 26, 1925. Serial No. 77,856.

The present invention relates to weighing scales generally, and more particularly to scales of the balance beam type wherein the parts are for the most part immersed in oil or like fluid for the protection of the parts from corrosion, such scales being commonly employed in a salty or other atmosphere which would have a deteriorative effect upon the metal parts were they left exposed.

The present invention is an improvement upon the scales of Rushton's United States Patent No. 1,211,881, patented January 9, 1917.

One object of the invention is to provide a scale of the immersed type with a novel spring arrangement to bring about a more rapid and accurate weighing than has been possible heretofore in this field with scales dependent solely upon the action of gravity. Another object is to render the scale quickly responsive by retarding the oscillations of the beam by a novel dash pot immersed in the bath of oil or like fluid which embraces the other scale parts, and to render the dash pot variably responsive by novel control exercised from a point outside the scale casing. Another object is to provide a scale which will be accurate for the weighing of butter or like commodities in a creamery or like place while maintaining the structure simple, easy of repair, and economical to manufacture. Another object is to provide novel means for conveniently adjusting the sensitiveness of the dash pot.

The various features and advantages of my invention will be more fully understood upon reference to the following detailed description taken in connection with the accompanying drawings, while the scope of the invention will be more particularly pointed out in the appended claims.

In said drawings, Fig. 1 is an elevational view illustrating a scale constructed in accordance with the present invention, the casing being shown in section taken on a longitudinal vertical plane; Fig. 2 is a view illustrating certain of the scale parts in elevation and others in section, the plane of section being indicated by the line 2—2 of Fig. 1; Fig. 3 is a plan view of the dash pot and nearby parts, certain of the parts being shown in section taken on a plane indicated by the line 3—3 of Fig. 1; Fig. 4 is a vertical section through one of the end posts and associated parts, the plane of section being indicated by the line 4—4 of Fig. 1; Fig. 5 is a perspective view of the dash pot and its control valve shown detached from other parts; Fig. 6 is an elevation of the same, the dash pot being shown in central section in association with its piston; Fig. 7 is a horizontal section through the control valve of the dash pot, the section being on a plane indicated by the line 7—7 of Fig. 6; Fig. 8 is a similar section taken on a plane indicated by the line 8—8 of Fig. 6; Fig. 9 is a front elevation of a dial plate calibrated for ice cream overrun testing; Fig. 10 is a similar view of another dial plate calibrated for butter print weighing; Fig. 11 is a central vertical section through a modified scale casing illustrating the dash pot adjusting rod wholly within the casing; Fig. 12 is a plan view of the same; and Fig. 13 is a transverse sectional view illustrating the pointer and dial of Fig. 9. Throughout these views like characters refer to like parts.

Referring to the drawings in detail, 10 designates the casing, 11 the cover, which is held in place upon the casing by screws 12, and 13 designates the extension casing formed integral with the cover and providing a space for the scale markings 14 and associated pointer 15. The markings 14 may be provided in any desired way and are preferably located in the upper end of the extension casing 13, which is provided with an opening 16 through which the markings may be observed.

The pointer 15 is secured at its lower end to the main balance beam 17. The latter is centrally pivoted and when exactly balanced the pointer rests at the zero indication of the markings 14. Other positions of the beam on either side of the balanced position are indicated by the markings on either side of the zero position just mentioned. These parts are usual and of themselves constitute no part of my present invention.

The beam 17 is provided with bosses 18 at its center and similar bosses 19 at its ends. Transverse apertures are provided through these three bosses for the passage of three bearing members in the form of knife blades 20 and 21. In the case of the central blade 20 the sharp edge extends downward, while in the case of the end blades 21 the sharp edge in each instance extends upwards. Set screws 21¹ serve to hold the central blade 20 in accurate position and similar screws 22 serve to hold the end blades 21 in like accurate positions. The knife blades 20 and 21 cooperate with notched bearings 23 and 24. In the case of the central bearing the blade 20 engages the notches of two bearings 23. In like manner, each blade 21 engages the notches of two bearings 24. The bearings 23 and 24, like the knife edges, are of hardened steel or other like material which will stand continued wear without interfering with the accuracy of the scale weighings. At each bearing the notched bearing pieces rest in apertures in yokes. Thus, in the case of the central bearing the notched bearings 23 rest in apertures in the yoke 25 which is secured at its base to projecting lugs 26 upon the inside of the casing 10, machine bolts 27 being employed to firmly secure the yoke in position. In the case of the end bearings, the bearing pieces 24 rest in apertures in the yokes 28 which move up and down with the ends of the beam. The bearings 23 are firmly held in place by set screws 29 and end straps 30 which are secured to the yoke by screws 31. Similarly the end bearing pieces 23 are held in adjusted positions by set screws 32 and end straps 33, the latter being held in place by screws 34 passing directly into the yoke. The movable yokes 28 have pan supports in the form of screw rods 35 screwed into threaded apertures in the upper portion of the yokes 28, as clearly illustrated more particularly in Fig. 4. Each rod 35 is also screwed into a threaded opening in a boss on the under side of a scale pan 36. By this construction the pan 36 is directly supported upon the yoke 28 in each instance. On the under side of the pan 36 a cup 37 is provided, the same having a central threaded aperture by which it may be screwed up and down upon the rod 35. The purpose of this cup is to contain particles of metal 38, which may be necessary in giving the scale its final adjustments. When the cup 37 is screwed up against the pan 36, the weights 38 are out of sight and the user need pay no further attention to them. Indeed, the cup may be sealed against rotation, if desired, in order that the adjustment may not be tampered with by removing or adding to the weights 38.

Beneath the central yoke 25 is a central member in the form of a rod 39. This member extends downward from the yoke and is screwed into a threaded aperture in the base of the same, a nut 40 serving to lock the rod 39 in proper position. The yoke 25 and rod 39 constitute a central support for the beam 17 and other parts of the scale mechanism. Adjustable members also extend downward from the movable yokes 28. In each instance there is a threaded rod 41 which extends downward from the yoke 28, and a similarly threaded rod 42 which forms the lower part of the adjustable member. A threaded coupling 43 and lock nuts 44 complete these longitudinal members in each case. It should be noted that the rods 41 and 42 are oppositely threaded and the threads upon the upper and lower portions of the sleeve 43 correspond. This is also true of the upper and lower nuts 44. By moving the sleeve in one direction, the rods 41 and 42 are drawn together and the member is longitudinally shortened. By an opposite movement the member is longitudinally lengthened. The nuts 44 serve to lock the parts when the desired adjustment has been made. Links 45 and 46 pivotally connect the lower ends of the adjustable end members, comprising the rods 41 and 42, with the lower end of the central member 39. In the final adjustment of the parts the length of the member 45 between its pivotal points equals the length of the member 46 between its pivotal points, and each of these lengths is equal to the distance between the knife edge bearings 20 and 21 of the beam. Likewise, the length of the longitudinal adjustable members, comprising the rods 41 and 42, is in each instance equal to the distance from the knife edge 20 down to the point at which the links 45 and 46 are pivoted to the member 39. With these dimensions established, a proper relation is maintained for the other adjustments of the scale.

The member 39 is provided with a transverse opening through which a cross bar 47 extends. This bar is provided at its opposite ends with threaded apertures for the passage of screws 48. Lock nuts 49 are also associated with these screws. The cross bar 47 is held in accurate position by a set screw 50 screwed into a suitable threaded aperture in the member 39. The screws 48 have transverse openings through them for receiving the lower ends of coiled springs 51. The latter are secured at their upper ends to the beam 17 by passing the end of the wire of the spring in each instance through an aperture in a lug 52 on the under side of the beam 17. The apertures in the lugs 52 are equidistant from a central vertical transverse plane through the knife edge of the member 20. The centers of the screws 48 are also equidistant from the same plane. Furthermore, the distance of the center of the screw 48 from the plane in each instance is the same as the center of the aperture in the lug 52 in each instance from the same plane. The springs 51 are of equal length and tension and are otherwise identical in every respect. In giving the final adjustments to the scale the screws 48 may be turned to vary the tension of the springs 51 for greater accuracy.

Besides the lugs 52, the beam 17 is provided with a lug 53 located on the under side of the beam and at a point more distant from the central pivotal point than the adjacent lug 52. The lug 53 has pivotally connected to it the stem 54 of a piston 55 of a dash pot 56. The latter is provided with a wide rim 57 by which it is secured to a lug or projection 58 on the inside of the casing 10 by means of screws 59. By this construction the dash pot is securely held in place at a point with its axis directly in line with the piston connection to the lug 53 upon the beam. It is obvious that the dash pot will be wholly submerged within the bath of oil or like fluid contained in the casing 10. As shown in the present instance, all the principal parts of the scale are submerged in this bath, the level of the bath being at the line 60 of Fig. 1.

For the purpose of regulating the effect of the dash pot, I provide the space in the latter below the piston 55 with an outlet through a tube 61 which is screwed into a threaded opening, or otherwise connected with, the pot 56. The tube 61 extends horizontally and is provided at its outer end with vertical openings for the passage of a valve rod 62. The upper end of this rod extends through the cover 11 of the casing and is provided at its upper end with a handle 63. The latter is merely a pin extending through a transverse opening in the upper end of the rod 62 and held in place by a set screw 64 screwed into a threaded opening in the end of the rod. The rod 62 has a transverse opening 65 through it at the point where it passes through the tube 61. By rotating the rod 62 the opening 65 may be more or less closed. The tube 61 and rod 62 with its opening 65 thus constitute a valve by which the size of the outlet from the dash pot may be controlled. For the purpose of properly positioning the rod 62 I employ a washer 66 about the rod 62 on the upper side of the tube 61. This washer is held in place by two pins 67 which extend through a transverse opening in the rod 62 and have their ends bent back about the sides of the rod 62, as clearly illustrated in Fig. 8. On the under side of the tube 61 I employ a coiled spring 68 which closely embraces the rod 62 and bears at its upper end against the under side of the tube 61 and at its lower end against a washer 69 which is similarly held in place by pins 70 passing through an aperture and having their ends bent back in the same manner as the pins 67 of Fig. 8. It will be seen that with this construction the handle 63 of the valve rod 62 may be readily turned to vary the opening 65 and thus vary the sensitiveness of the dash pot. It will also be appreciated that the latter must operate under the head provided by the level 60 of the oil or other protecting fluid within the casing 10.

Obviously in lieu of the valve rod extending upward through the cover of the casing it may be positioned wholly within the casing. Such an arrangement is illustrated in Figs. 11 and 12. As there shown, the valve rod, designated 62¹, extends through an opening in a web 75, preferably integral with the cover 11, and is provided with a handle 63¹ and a kerf 76 in its upper end. The rod 62¹ may be rotated either by grasping and moving the handle 63¹ or by using a screw driven upon the kerfed end of the rod. The end of the rod 62¹ is enclosed within the casing by a cover 77 which may be secured in place in any desired way. In the present instance, screws 78 and 79 pass through openings in vertical and horizontal flanges of the cover 77 into threaded openings in the casing extension 12 and the cover 11 respectively. These screws have knurled heads so that they may be easily removed by hand when it becomes necessary or desirable to remove the cover 77. A gasket 80 is preferably used between the cover 77 and the parts of the casing.

The scale markings 14 are such that the designations show relative departures from an exact balance. These may be in units of any desired kind. They may be calibrated in any desired way. For a more specific illustration of use and calibration, attention is called to the dial 81 of Fig. 10 where the designations 82 are in fractions of an ounce calibrated for the use of the scale in weighing butter prints, lard prints and the like. Another dial 83, shown in Fig. 9, has two sets of markings for measuring overrun, the markings 84 giving the same in percentages and the markings 85 giving the same in terms of pounds per U. S. gallon. In the latter case, the pointer, designated 15¹, has two indicating points 86 and 87 cooperating with the markings 84 and 85 respectively. In this instance the pointer proper lies behind the dial and the points extend through the slot 88 being shaped as illustrated particularly in Fig. 13. When the dial 81 is used with the pointer 15¹ then the point 87 may be omitted if desired, as there will be no markings for it to cooperate with. In this case the point 86 will extend through the slot 89 in dial 81.

Both dials 81 and 83 are provided with slots 90 near their ends and screws passing through them into threaded engagement with holes in the back of the extension 12 serve to hold the dials in place. One such screw, designated 91, is shown in Fig. 13. At the point where the screw enters the extension back the latter is preferably provided with a boss 92 to space the dial from the back far enough to leave space for the easy to and fro movements of the pointer 15¹.

It may be explained that in calibrating these dials the strength of the springs 51, the depth of the oil or other liquid in the casing, and the locations of the markings are interdependent. In initially determining the relation of these elements, I first select the springs, then fill the casing with the liquid up to a height which will properly cover the scale parts and allow about the right movement of the pointer. The dial is then calibrated. Subsequently manufactured dials are made like the first. Then with the same strength of springs and the same liquid and liquid level, the calibrations on all subsequently manufactured dials will be correct. They may also be used with springs of different strength by changing the level of the liquid in the casing. With the subsequently manufactured dials in place, each scale is accurately adjusted by varying the liquid level until the scale operates so as to give the correct indications.

In the case of the dial 81, if the pointer rests at the designation 1/8, the print or other commodity is 1/8 of an ounce over weight or under weight. Similarly the designations 1/4, 3/8, and 1/2 shows 1/4 of an ounce, 3/8 of an ounce and 1/2 of an ounce over or under weight. In weighing butter prints a standard weight is placed on one pan 36 and the print on the other. The shortage or overweight are indicated by the markings, as just stated.

In the use of the overrun dial 83, a weight is placed upon the left hand pan 36 and kept there. This weight moves the pointer away to the left. A testing cup is used on the right hand pan 36. When the cup is filled with the ice cream mix, and placed on its pan, the weight on the left hand pan is balanced with the pointer at zero. When the cup is half full of the mix then the pointer rests at 100; similarly when three fourths full the indication is 33 1/3; and so on for other fractional fillings and percentage markings. To suit different mixes, that is, mixes having different densities, the weight on the left hand pan 36 may be kept constant and the cup capacity varied by using a cup, for example, like that illustrated and described in U. S. Patent No. 1,445,789, dated Feb. 20, 1923. Or, in lieu of employing a cup of variable capacity and an unchangeable weight on the opposite scale pans 36, I may keep the cup capacity constant and vary the aforesaid weight. These various ways of operating the scale for the purpose of measuring overrun form no part of the present invention but are recited to show how the dial 83 may be used. For a fuller disclosure of the method and apparatus employed in determining overrun attention is called to U. S. application of J. J. Mojonnier, Serial No. 238,184, filed June 4, 1918, issued August 3, 1926, as Patent No. 1,594,546. The subject is also fully discussed in Technical Control of Dairy Products by T. Mojonnier and H. C. Troy, 1922. The designations 85 upon dial 83 are in units of pounds per U. S. gallon and the same constitute another well known way of designating overrun measurements. When the designations 85 are used a cup of constant capacity is employed on one scale pan and a constant weight on the other.

It is believed that in carrying out my invention many minor changes may be made in the details of the disclosure herewith presented without departing from the spirit and scope of the invention. It is my aim therefore to cover all changes which rightly come within the purview of my invention by the terms of the appended claims.

What I claim as new and desire to secure by a patent of the United States is:

1. In a weighing scale, the combination of a balance beam, a central pivotal support for said beam, upwardly extending pan supports pivotally connected to the ends of said beam, a central member extending downward from said central support, longitudinally adjustable members extending downward from said pan supports, links pivoted to the lower ends of said adjustable members and to said central member, a cross bar in the plane of said beam fixed at its center to said central member, and coiled springs of equal tension and length extending from said cross bar to said beam, the points of connection being equally distant from a transverse vertical plane through the center of said central pivoted support when said beam is in balanced position.

2. In a weighing scale, the combination of a balance beam, three angular bearing blades extending transversely of said beam and fixed thereto at their centers, one blade being at the center of said beam and the others at its ends, three connecting yokes each having openings in its yoke arms forward and back of said beam and notched bearings in said openings in the notches of which said blade ends rest, said central yoke being fixed and said end yokes being movable with said beam, a central member extending downward from said central yoke, longitudinally adjustable members extending downward from said end yokes, links pivotally connected to the lower ends of said central and adjustable members, a cross bar in the plane of said beam fixed at its center to said central member, and coiled springs of equal tension and length extending between said cross bar and beam on opposite sides of said central member, the points of connection being equally distant from a vertical plane through the central one of said bearing blades.

3. In a weighing scale, the combination of a casing adapted to contain a quantity of oil or similar fluid, a balance beam centrally pivoted within said casing below the level of the fluid therein, pan supports pivotally connected to the ends of said beam below the fluid level and extending above said casing, equal coiled springs below said beam symmetrically disposed on opposite sides of a central vertical place at right angles to the longitudinal axis of the beam, mechanical connections for maintaining said pan supports vertical for all operative positions of said beam, a dash pot within said casing below said beam, a piston in said pot pivotally connected to said beam, a horizontal tube communicating with said pot below said piston, a vertical valve rod extending upward above said casing and downward through an opening in said tube and having a transverse opening in line with the bore of said tube to vary the outlet from said pot, and means at the upper end of said valve rod whereby the same may be readily rotated thus to vary the dash pot action.

4. In a weighing scale, the combination of a casing adapted to contain a quantity of oil or similar fluid, a balance beam centrally pivoted within said casing below the level of the fluid therein, pan supports pivotally connected to the ends of said beam below the fluid level and extending above said casing, springs and mechanical means tending to maintain said beam, when unloaded, in balanced position, a dash pot secured to said casing below the level of the fluid therein, a piston movable in said pot, and connecting means between said beam and piston to cause the dash pot and piston to dampen the oscillations of said beam.

5. In a weighing scale, the combination of a casing adapted to contain a quantity of oil or similar fluid, movable scale parts within said casing below said fluid level, dash pot parts below said fluid level for damping the movements of said movable scale parts, a vertical stem extending from the vicinity of said dash pot parts to a point above said fluid level, and means actuated by said stem to vary the action of said dash pot parts.

6. In a weighing scale, the combination of a casing adapted to contain a quantity of oil or similar fluid, movable scale parts within said casing below said fluid level, dash pot parts below said fluid level for damping the movements of said movable scale parts, a tube communicating with the pot of said dash pot parts, a vertical valve rod extending upward above said fluid level and downward through an opening in said tube and having an opening to vary the flow of fluid through said tube, and means at the upper end of said rod for use in rotating said rod thus to vary the dash pot action.

7. In a weighing scale, the combination of a balance beam, a central pivotal support for said beam, weight pans pivotally connected to the ends of said beam, longitudinally adjustable members extending downward from said pans, links pivotally connected to said members and to said support, the connections being symmetrical upon opposite sides of a vertical plane through the central pivotal axis of said beam, a cross bar in the plane of said beam fixed to said support, and coiled springs of equal tension and length extending from said beam to said cross bar, the latter points of connection also being symmetrical upon opposite sides of said vertical plane.

8. In a weighing scale, the combination of a balance beam, a central pivotal support for said beam, weight pans pivotally connected to the ends of said beam, members extending downward from said pans, mechanical connecting means pivotally connected to said last mentioned members and to said support, the connections being symmetrical upon opposite sides of a vertical plane through the central pivotal axis of said beam, downwardly extending coiled springs of equal tension and length connected at their upper ends to said beam on opposite sides of said vertical plane, and means for mechanically connecting the lower ends of said springs to said support on opposite sides of said plane, the points of connection of said springs also being symmetrical with reference to said vertical plane.

In testimony whereof, I hereunto subscribe my name this 21st day of Dec., A. D. 1925.

OLIVER W. MOJONNIER.